United States Patent [19]

Rudd et al.

[11] Patent Number: 4,921,764

[45] Date of Patent: May 1, 1990

[54] POLYESTER FILM COATED WITH METAL ADHESION PROMOTING COATING AND HAVING SUPERIOR WINDING PERFORMANCE

[75] Inventors: David Rudd, Naples, N.C.; Sandra W. Rice, Greer, S.C.

[73] Assignee: Hoechst Celanese Corporation, Somerville, N.J.

[21] Appl. No.: 306,115

[22] Filed: Feb. 6, 1989

Related U.S. Application Data

[62] Division of Ser. No. 138,228, Dec. 28, 1987, Pat. No. 4,845,189.

[51] Int. Cl.$^5$ ............................................. B32B 27/06
[52] U.S. Cl. ..................................... 428/480; 528/272; 528/295; 528/302; 528/304; 528/308; 428/344; 428/345; 428/349; 428/458; 428/631; 428/638; 428/644; 428/671; 264/135; 264/136; 264/137; 264/165; 264/172; 264/176.1; 264/184; 264/210.7; 264/556
[58] Field of Search .............. 528/272, 295, 302, 304, 528/308; 428/480, 631, 638, 644, 650, 658, 671, 344, 345, 349, 458; 264/556, 135, 136, 137, 165, 172, 176.1, 184, 210.7

[56] References Cited

U.S. PATENT DOCUMENTS

| | | | |
|---|---|---|---|
| 3,563,942 | 2/1971 | Heiberger | 524/602 |
| 3,779,993 | 12/1973 | Kibler et al. | 528/295 |
| 4,268,645 | 5/1981 | Lark | 525/437 |
| 4,486,483 | 12/1984 | Caines | 428/195 |
| 4,493,872 | 1/1985 | Funderburk et al. | 428/332 |
| 4,554,200 | 11/1985 | Caines | 428/207 |
| 4,590,119 | 5/1986 | Kawakami et al. | 428/216 |
| 4,699,845 | 10/1987 | Oikawa et al. | 428/480 |
| 4,845,189 | 7/1989 | Rudd et al. | 528/272 |

*Primary Examiner*—John Kight
*Assistant Examiner*—S. A. Acquah
*Attorney, Agent, or Firm*—Gregory N. Clements

[57] ABSTRACT

An aqueous coating composition is provided for thermoplastic films comprising (i) from 1 to 10 weight percent based upon the total weight of the coating composition, of a sulfonated copolyester consisting essentially of the polyester condensation product of the following monomers or their polyester-forming equivalents:
  (A) about 65 to 95 mole percent of isophthalic acid;
  (B) about 0 to 30 mole percent of at least one aliphatic dicarboxylic acid of the formula $HOOC(CH_2)_nCOOH$, wherein n ranges from about 1–11;
  (C) about 5 to about 15 mole percent of at least one sulfomonomer containing an alkali metal sulfonate group attached to a dicarboxylic aromatic nucleus; and
  (D) stoichiometric quantities of about 100 mole percent of at least one copolymerizable aliphatic or cycloaliphatic alkylene glycol having about from 2 to 11 carbon atoms,
(ii) from 0.05 to 3 weight percent, based upon the total weight of the coating composition, of at least one water soluble alkali metal salt of an unsaturated fatty acid having from 10 to 18 carbon atoms.

The aqueous coating composition of the present invention, when applied to thermoplastic films, exhibits at least equivalent adhesion to subsequently applied metallic coatings and also exhibits superior winding performance in comparison to the prior art films.

12 Claims, No Drawings

POLYESTER FILM COATED WITH METAL ADHESION PROMOTING COATING AND HAVING SUPERIOR WINDING PERFORMANCE

This is a division of application Ser. No. 07/138,228 filed Dec. 28, 1987, now U.S. Pat. No. 4,845,189.

BACKGROUND OF THE INVENTION

The present invention relates to oriented polyester films having an improved metal adhesion promoting coating applied thereto. The improved coating composition permits rapid, non-sticking winding and unwinding while providing the same level of adhesion to subsequently-applied metallic layers as previous primed polyester films.

Metallic coated polyester films have utility in various packaging and solar control applications. The commercial acceptance of such films depends, inter alia, upon a good metallic layer/polyester film bond. Consequently, a body of art has developed which is directed to improving the adhesion of polyester films to subsequently applied metallic layers.

F. Funderburk et al, "Polyester Film Coated With Metal Adhesion Promoting Copolyester," U.S. Pat. No. 4,493,872 Jan. 15, 1985) discloses a polyester film coated with a sulfonated copolyester coating composition. Polyester films covered by this patent have achieved extraordinary commercial success, as evidenced by outstanding sales. The Association of Industrial Metallizers, Coaters and Laminators (AIMCAL) awarded these films first place in its 1987 Technology of the Year Award.

Unfortunately, the adhesive nature of the sulfonated copolyester coating composition can create processing difficulties in the manufacture and subsequent metallization of these films. In particular, adjacent layers of these sulfonated copolyester coated films tend to stick together when wound into a roll. This sticking problem is most apparent when both sides of the film have been coated with the adhesive coating.

The severity of the sticking problem can be somewhat reduced by the inclusion of silica particles in the sulfonated copolyester coating composition. However, the addition of silica particles can create other problems, including the formation of undesirable coating patterns on the film surface. The silica can also alter the pH of the coating composition, thereby requiring the addition of a buffering agent, which may result in a shortened pot-life.

T. Oikawa et al, "Easily Adhesive Polyester Film," U.S. Pat. No. 4,699,845 (Oct. 13, 1987) broadly describes a polyester film having a coating layer on at least one surface which comprises a mixture of a higher fatty acid wax and a sulfonated copolyester. The addition of the higher fatty acid ester wax is said to improve the anti-blocking properties of the film. The coating can be applied as an aqueous dispersion between stretching operations. The "higher fatty acid wax" is defined as an aliphatic ester compound of a higher fatty acid having from 12 to 35 carbon atoms and an alcohol having from 15 to 35 carbon atoms. Carnauba wax, montan wax, wool wax and shellac wax are specifically disclosed as examples of the higher fatty acid wax. Carnauba wax and montan wax are especially preferred. The '845 patent also suggests that these higher fatty acid waxes can be modified by converting a part or all of the fatty acid ester to the corresponding alkali metal salt (such as sodium or potassium), or the corresponding alkali metal compound (such as calcium, magnesium or barium). The sulfonated copolyester is broadly disclosed as the reaction product of an aromatic dicarboxylic acid monomer and a glycol component in which part of the aromatic dicarboxylic acid is an alkali metal salt of an ester forming aromatic sulfonic acid such as 5-sodium sulfoisophthalate, sodium sulfoterephthalate and their ester forming derivatives. The dicarboxylic acid comonomer should comprise at least 60 mole percent of the sulfonated copolyester. The alkali metal salt of the ester-forming aromatic sulfonic acid should be present in an amount ranging from 7 to 40 mole percent, preferably 10 to 20 mole percent, of the total acidic reactants present.

BRIEF SUMMARY OF THE INVENTION

In one aspect, the present invention is an aqueous coating composition for thermoplastic films comprising (i) from 1 to 10 weight percent, based upon the total weight of the coating composition, of a sulfonated copolyester consisting essentially of the polyester condensation product of the following monomers or their polyester-forming equivalents:
  (A) about 65 to 95 mole percent of isophthalic acid;
  (B) about 0 to 30 mole percent of at least one aliphatic dicarboxylic acid of the formula $HOOC(CH_2)_n COOH$, wherein n ranges from about 1–11;
  (C) about 5 to about 15 mole percent of at least one sulfomonomer containing an alkali metal sulfonate group attached to a dicarboxylic aromatic nucleus; and
  (D) stoichiometric quantities of about 100 mole percent of at least one copolymerizable aliphatic or cycloaliphatic alkylene glycol having about from 2 to 11 carbon atoms, (ii) from 0.05 to 3 weight percent, based upon the total weight of the coating composition, of at least one water soluble alkali metal salt of a fatty acid having from 10 to 18 carbon atoms.

In another aspect, the present invention is an oriented thermoplastic film having a metal adhesion promoting coating on at least one side, said coating being applied as an aqueous coating composition comprising (i) from 1 to 10 weight percent, based upon the total weight of the coating composition, of a sulfonated copolyester consisting essentially of the polyester condensation product of the following monomers or their polyester-forming equivalents:
  (A) about 65 to 95 mole percent of isophthalic acid;
  (B) about 0 to 30 mole percent of at least one aliphatic dicarboxylic acid of the formula $HOOC(CH_2)_n COOH$, wherein n ranges from about 1–11;
  (C) about 5 to about 15 mole percent of at least one sulfomonomer containing an alkali metal sulfonate group attached to a dicarboxylic aromatic nucleus; and
  (D) stoichiometric quantities of about 100 mole percent of at least one copolymerizable aliphatic or cycloaliphatic alkylene glycol having about from 2 to 11 carbon atoms, (ii) from 0.05 to 3 weight percent, based upon the total weight of the coating composition, of at least one water soluble alkali metal salt of a fatty acid having from 10 to 18 carbon atoms.

In yet another aspect, the present invention is an improved method for manufacturing a thermoplastic oriented film which has been coated with a metal adhesion promoting coating comprising (i) extruding a substantially amorphous thermoplastic resin in sheet-like form and subsequently cooling said resin to form cast thermoplastic sheet, (ii) subsequently orienting said thermoplastic sheet in the longitudinal direction, thereby forming monoaxially oriented thermoplastic film, (iii) coating said orienting thermoplastic film with an aqueous coating composition comprising (a) from 1 to 10 weight percent, based upon the total weight of the coating composition, of a sulfonated copolyester consisting essentially of the polyester condensation product of the following monomers or their polyester-forming equivalents:

(A) about 65 to 95 mole percent of isophthalic acid;

(B) about 0 to 30 mole percent of at least one aliphatic dicarboxylic acid of the formula $HOOC(CH_2)_n\text{-}COOH$, wherein n ranges from about 1-11;

(C) about 5 to about 15 mole percent of at least one sulfomonomer containing an alkali metal sulfonate group attached to a dicarboxylic aromatic nucleus; and (D) stoichiometric quantities of about 100 mole percent of at least one copolymerizable aliphatic or cycloaliphatic alkylene glycol having about from 2 to 11 carbon atoms, (b) from 0.05 to 3 weight percent, based upon the total weight of the coating composition, of at least one water soluble alkali metal salt of a fatty acid having from 10 to 18 carbon atoms, (iv) subsequently orienting said monoaxially oriented thermoplastic film in the transverse direction, thereby forming biaxially oriented thermoplastic film, (v) heatsetting said biaxially oriented thermoplastic film.

In another aspect, the present invention relates to a metallized film comprising a base of plastic material, a primer coating applied to one or both sides of said base material at a dry weight thickness within the range of about $10^{-7}$ to about $10^{-5}$ inch, said primer coating consisting essentially of (1) the polyester condensation product of the following monomers or their polyester forming equivalents:

(A) about 65 to 95 mole percent of isophthalic acid;

(B) about 0 to 30 mole percent of at least one aliphatic dicarboxylic acid of the formula $HOOC(CH_2)_n COOH$, wherein n ranges from about 1-11;

(C) about 5 to about 15 mole percent of at least one sulfomonomer containing an alkali metal sulfonate group attached to a dicarboxylic aromatic nucleus; and (D) stoichiometric quantities of about 100 mole percent of at least one copolymerizable aliphatic or cycloaliphatic alkylene glycol having about from 2 to 11 carbon atoms, and (2) at least one water soluble alkali metal salt of a fatty acid having from 10 to 18 carbon atoms, said film having a metal coating, the thickness of said metal coating ranging from about 25 to 2000 angstroms.

DETAILED DESCRIPTION OF THE INVENTION

The oriented thermoplastic film which forms a part of the present invention may comprise, but is not limited to, polyester, polyamide, polycarbonate or polyolefin, such as polyethylene and polypropylene. Oriented polyester film is preferred.

The preferred oriented polyester film for the purposes of this invention is made from polyethylene terephthalate, although the invention is applicable to polyester film prepared from the polycondensation of a glycol such as ethylene glycol or butanediol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The film may be produced by conventional techniques using well known apparatus.

For example, the polyester resin may be melted and extruded as an amorphous sheet onto a polished revolving casting drum to form a cast sheet of polymer. Thereafter, the cast sheet may be axially stretched in one direction, either in the direction of extrusion ("machine direction") or perpendicular to the direction of extrusion ("transverse direction") in the case of monoaxially oriented film. Biaxially oriented film is stretched in both the longitudinal and transverse directions. The first stretching step of the cast sheet may be in either of these two orthogonal directions. The amount of stretching employed to impart strength and toughness to the film can range from about 3.0 to about 5.0 times the original cast sheet dimension in one or both directions. Preferably, the amount of stretching is in the range of between about 3.2 and 4.2 times the original cast sheet dimension. The stretching operations are carried out at temperatures in the range of from about the second order transition temperature to below the temperature at which the polymer softens and melts.

Where desired, the film is heat treated, after stretching, for a period of time necessary to crystallize the polyester film. Crystallization imparts stability and good tensile properties to the film. When polyethylene terephthalate is heat treated, it is subjected to a temperature in the range of from about 190° C. to 240° C. and, more preferably, in the range from about 215° C. to 235° C.

The sulfonated copolyester which forms part of the present invention may be conveniently prepared by polycondensing (A) isophthalic acid, (B) an aliphatic dicarboxylic acid having the formula $HOOC(CH_2)_n\text{-}COOH$, n being 1-11; (C) a sulfomonomer containing an alkali metal sulfonate group attached to a difunctional dicarboxylic aromatic nucleus, and (D) at least one aliphatic or cycloaliphatic alkylene glycol having from about 2 to 11 carbon atoms. The total acid equivalents present should be substantially equal to the total glycol equivalents on a molar basis.

Examples of dicarboxlic acids suitable as components (B) of the copolyesters include malonic, adipic, azelaic, glutaric, sebacic, succinic, brassylic acids and mixtures thereof, or their polyester forming equivalents. Sebacic acid is preferred.

Examples of sulfomonomers containing a metal sulfonate group attached to a dicarboxylic aromatic nucleus (Component C) are those materials generally represented by the formula:

wherein:

M is a monovalent cation of an alkali metal;

Z is a trivalent aromatic radical; and

X and Y are carboxyl groups or polyester forming equivalents.

Such monomers are disclosed in U.S. Pat. Nos. 3,563,942 and 3,779,993, each of which are expressly incorporated herein by reference. Species of such monomers include sodium sulfoterephthalic acid; sodium 5-sulfoisophthalic acid; sodium sulfophthalic acid; 5-(p-sodiosulfophenoxy)-isophthalic acid; 5-(sulfopropoxy) isophthalic acid,sodium salt; and like materials as well as their polyester forming equivalents, such as the dimethyl esters. Preferably M is Na+, Li+ or K+.

The term "polyester forming equivalents" as used herein means reactants having groups capable of undergoing condensation reactions to form polyester linkages, which groups include carboxylic groups as well as lower alkyl esters thereof, e.g., dimethyl terephthalate, diethyl terephthalate and many other corresponding esters, halides or salts. It is preferred to employ the acid monomers as the dimethyl esters as this facilitates better control of the condensation reaction.

Examples of glycols suitable as component D include ethylene glycol; 1,5-pentanediol; 1,6-hexanediol; neopentyl glycol; 1,10-decanediol; cyclohexane dimethanol; and similar materials. Ethylene glycol is the much preferred glycol.

The copolyesters may be prepared by well known polymerization techniques. The general procedure is to combine the acid components with glycol and heat in the presence of an esterification catalyst, followed by the subsequent addition of a polycondensation catalyst.

The relative proportions of the components (A), (B), (C) and (D) which are employed in making the sulfonated copolyester which forms part of this invention are critical to achieving a primed film offering satisfactory adhesion to metal applied using metallizing techniques. Also, the identity of these components is critical and thus the term "consisting essentially of" is meant to exclude from the aqueous coating composition those monomeric materials in amounts significant enough to seriously detract from the adhesion properties of the primer to subsequently applied metals. For examples, isophthalic acid (component A) must be present at least about 65 mole percent on the acid side. Also, the presence of more than about 15 mole percent of another aromatic acid such as terephthalic acid, has been found to detract from the adhesion of the primer to metallic coatings. Ideally component (A) is relatively pure isophthalic acid present at a target level of about 70 to about 95 mole percent.

As to optimal component (B), any acid within the formula set forth above will provide satisfactory results, with the preferred acids being adipic, azelaic, sebacic, malonic, succinic, glutaric and mixtures thereof. The target level within the range set forth is about 1 to about 20 mole percent on the acid side when component (B) is present in the composition.

With regard to component (C), the lower limit of about 5 percent of this monomer is required in this system to impart water dispersibility to the primer. The preferred range for this material is about 6.5 to about 12 mole percent.

On the glycol side, this material is present in approximately stoichiometric quantities.

The sulfonated copolyester resin which forms part of this invention may be further characterized as having an acid number of less than 10, preferably from about 0 to about 3, a number average molecular weight of less than about 50,000, and an RV (relative viscosity measured as a 1 percent solution in dichloroacetic acid at 25° C. using an Ubbelohde Capillary Viscometer) within the range of aout 30 to 700, more preferably in the range of about 450 to 650.

Polyester films coated one or both sides with the above-described sulfonated copolyester coating are disclosed in U.S. Pat. No. 4,493,872, the disclosure of which is hereby expressly incorporated by reference herein.

The alkali metal salts which form part of this invention may be alkali metal salts of fatty acids having from about 10 to 18 carbon atoms. Unsaturated fatty acid salts, particularly sodium oleate and potassium oleate, are preferred. Other alkali metal salts believed useful as part of this invention include the sodium and potassium salts of palmitoleic, ricinoleic and petroselinic acids.

Polyester films coated on one or both sides with the above-described alkali metal salts are disclosed in U.S. Pat. Nos. 4,486,483 and 4,554,200, the disclosures of which are each expressly hereby incorporated by reference herein.

The aqueous coating composition of the present invention may be coveniently prepared by first preparing an aqueous dispersion of the sulfonated copolyester and subsequently adding the desired amount of the alkali metal salt.

The sulfonated copolyester resin which is a part of the present invention forms a milky white aqueous dispersion. The dispersion may be conveniently prepared by addition of the desired amount of the sulfonated copolyester (typically in chip or pellet form) to deionized water which has been preheated to 90°–95° C., followed by stirring for approximately 30–45 minutes. The copolyester molecules typcially disperse as aggregates having an average particle size of approximately 100 to 200 nanometers. The milky white appearance is caused by the presence of much larger (approximately 25–50 micron) polyethylene isophthalate dimer particles. These polyethylene isophthalate dimer particles can create coating patterns on the film substrate and also present long-term stability and storage problems. It is therefore much preferred to "clarify" the aqueous copolyester dispersion by substantially removing these dimer particles.

A preferred method for removing the polyethylene isophthalate dimer particles from the aqueous copolyester dispersion comprises the addition of a filter aid such as diatomaceous earth to form a slurry, followed by filtration. The slurry is filtered through a filter paper having a sufficiently small porosity that it will stop the filter aid. As the slurry is filtered, a cake of filter aid will build up on the filter paper, thereby providing depth media filtration. The filter aid cake is preferably washed with deionized water to extract sulfonated copolyester particles retained by the filter aid. Vacuum and/or pressure may be applied to the filter aid cake to aid in the extraction of the sulfonated copolyester particles.

The most preferred method for the preparation of a clarified sulfonated copolyester aqueous dispersion is as follows:

1. Preheat deionized water to 90°–95° C.,
2. Add approximately 20% by weight of the desired amount of sulfonated copolyester chip to the preheated water using constant agitation. Add the remaining sulfonated copolyester in several portions over the course of 30 minutes with constant stirring, thereby forming a crude aqueous dispersion having a milky white appearance.
3. Maintain the crude aqueous dispersion at 90°–95° C. for two hours.

4. Add 50% by weight of the sulfonated copolyester of a diatomaceous filter acid commercially available from Manville Corporation under the trademark CELITE 545, thereby forming a slurry.

5. Mix the slurry for 30 minutes and cool.

6. Filter the slurry through a conventional plate and frame press using 10 and 1 micron cartridge afterfilters.

7. Charge the mixing vessel with an equal volume of deionized water, and wash the filtration press/cartridge system to extract retained sulfonated copolyester particles.

The "clarified" sulfonated copolyester dispersions so prepared display greatly reduced coating patterns when applied to polyester film substrates in comparison to "crude" (unclarified) copolyester dispersions containing the polyethylene isophthalate dimer particles.

The coating compositions of the present invention may be conveniently prepared by simply adding the desired amount of an alkali metal salt of a fatty acid to the sulfonated copolyester aqueous dispersion. Heat and agitation may aid in assuring a homogeneous solution. For example, to prepare 1500 grams of an aqueous coating composition comprising 0.25 weight percent of sulfonated copolyester and 0.20 weight percent of sodium oleate, 75 grams of a clarified 5% sulfonated copolyester solution are added to 1422 grams of warm water, followed by the addition of 3 grams of dry sodium oleate to the solution with stirring.

The aqueous coating compositions of the present invention may be applied to the oriented thermoplastic film by any of the well known coating techniques employed in the film manufacturing arts. For example, coating may be effected by roller coating, spray coating, slot coating or immersion coating. In a preferred embodiment, the thermoplastic film is coated by means of gravure roller coating. Also, the film surface is preferably subjected to a corona discharge by a corona discharge apparatus prior to coating as is disclosed in U.S. Pat. Nos. 3,520,959; 3,820,939; and 4,028,032. The corona discharge treatment decreases the hydrophobic character of the thermoplastic film surface, which permits the aqueous coating to more easily wet the surface and thus improve the adhesion of the coating to the film surface.

The aqueous coating composition of the present invention may be applied to the thermoplastic film "in-line" at any stage during the film manufacture; the pre-draw stage at the point between the casting of the amorphous sheet and the first stretch such as disclosed, for example, in British Pat. No. 1,411,564 or the inter-draw stage subsequent to the uniaxial drawing but prior to biaxial drawing such as disclosed, for example, in U.S. Pat. No. 4,214,035. Normally, the heat applied to the film during the stretching or final conditioning stages is sufficient to evaporate the water and other volatiles and dry the coating. The coating may also be applied off-line subsequent to the stretching operations to the finished biaxially oriented film. Such application necessitates a separate drying step.

The aqueous coating composition of the present invention may be applied to a thermoplastic film substrate so as to produce a final dry coating thickness within the range of from about $10^{-7}$ to $10^{-5}$ inch, which corresponds to a dry coating weight ranging from about 0.00305 to 0.305 g/m². The preferred thickness range of the dried coating is from $8.0 \times 10^{-7}$ to $2.0 \times 10^{-6}$ inch, with $1 \times 10^{-6}$ inch being the target thickness.

The aqueous coating composition may be applied to one or both sides of the film, or it may be applied to one side and different coatings such as a thermosetting acrylic or methacrylic coating, applied to the opposite side, as taught in U.S. Pat. No. 4,214,035. In come cases, it may be desirable to include a hardening agent in the copolymer coating formulation, e.g., from about 1-20 percent by weight of a melamine or urea/formaldehyde condensation product, to further modify the properties of the primer coating. Other additives known in the art may also be present in the coating formulation such as antistatic agents, wetting agents, surfactants, pH regulating agents antioxidants, dyes, pigments, and the like.

It is believed that thermoplastic films which have been coated with the aqueous coating composition of the present invention will be reclaimable. The sulfonated copolyester which forms part of this invention exhibits excellent heat stability. Similarly, the alkali metal fatty acid salts which form part of the present invention possess relatively good heat stability. Accordingly, it is believed that any scrap coated film made during production can be mixed with fresh polymer, e.g., polyester polymer, re-melted and re-fed to the film-forming extruder to produce oriented film. Such films produced containing up to about 70 percent by weight of coated scrap reclaim should exhibit good quality, color and appearance with very little if any perceptible degradation of properties due to the presence of the coating impurity. Thus the coated film of the present invention should offer a distinct commercial advantage to the film manufacturer over many other coated films, such as films coated with vinylidene chloride-containing polymers as disclosed in U.S. Pat. Nos. 2,627,088 and 2,698,240, which tend to degrade and discolor when reclaimed as set forth above.

Thermoplastic film, e.g. polyester film, which has been coated with the aqueous coating composition of this invention has excellent utility as a base for the production of metallized polyester films. Such films are prepared by well known prior art techniques such as by forming a metallic coating on a surface of the coated polyester film by directing a stream of metal vapor or atoms onto the surface of the film by a vacuum deposition technique. This is effected by heating the metal in a high vacuum, preferably in the range of about $10^{-3}$ to about $10^{-5}$ torr, to a temperature about its melting point such that the vapor pressure of the metal exceeds about $10^{-2}$ torr or it is effected by subjecting the metal to a stream of bombarding ions whereby the metal is removed by mass transfer "sputtering". When these conditions are achieved, the metal is vaporized or sputtered, emitting metal vapors or atoms in all directions. These vapors or atoms impinge on the film surface, condense and thereby form a thin metallic coating on the film. Metals applicable to this process include zinc, nickel, silver, copper, gold, indium, tin, stainless steel, chromium, titanium and, most preferably, aluminum, and include the oxides of such metals. The thickness of the applied metal coating is a matter of preference depending upon the final use of the metallized film. Thicknesses for aluminum in packaging applications range from about 300 to 600 angstroms, while thicknesses in solar applications are generally less than 100 angstroms.

EXAMPLES

The following examples illustrate the practice and advantages of specific embodiments of the present invention. In no event should these specie embodiments

EXAMPLE I

Evaluation of Various Aqueous Coating Compositions

A series of aqueous coating compositions were prepared from master batch solution of an aqueous, clarified sulfonated copolyester solution and (2) an aqueous solution sodium oleate having a concentration of 0.75 weight percent.

The sulfonated copolyester comprised approximately 90 mole percent isophthalic acid, 10 mole percent of the sodium salt of 5-sulfoisophthalic acid, and 100 mole percent ethylene glycol, and was prepared according to the general procedures set forth in U.S. Pat. No. 4,493,872. A 5% master batch solution was prepared and clarified according to the clarification procedures described above.

Nine aqueous coating solutions were then prepared as follows:

| Solution | Sulfonated Copolyester | Sodium Oleate |
|---|---|---|
| A | 5.0% | 0 |
| B | 4.9% | 0.015% |
| C | 4.75% | 0.0375% |
| D | 3.75% | 0.1875% |
| E | 2.5% | 0.375% |
| F | 1.25% | 0.3625% |
| G | 0.5% | 0.65% |
| H | 0.1% | 0.735% |
| I | 0 | 0.75% |

Polyethylene terephthalate polymer was melted and extruded through a slot die onto a casting drum maintained at a temperature of about 20° C. The melt froze to form a cast polyester sheet. The cast polyester sheet was longitudinally stretched at a draw ratio of approximately 3.5:1 while being maintained at a temperature of about 80° C.

The uniaxially oriented polyester film was electric corona discharge treated on both sides of the film at a power level of 2.8 watts min./ft.$^2$ prior to being coated with one of the aqueous coating solutions described above.

The coated film was then stretched in the transverse direction at a draw ratio of 3.9:1 and then set at a maximum temperature of 230° C. to produce a biaxially oriented film having a nominal thickness of 48 gauge.

Samples of the series of coated, biaxially oriented, polyester films so prepared were evaluated for metal adhesion, blocking, and ink adhesion.

Metal Adhesion

Metal adhesion is evaluated by placing samples of the candidate films in a twelve inch laboratory vacuum coater. The vacuum chamber was evacuated to less than $10^{-4}$ torr pressure and appoximately 500 Angstoms of aluminum was evaporated onto the coated film sample surface from a tungsten filament.

Within 30 minutes after removal from the vacuum chamber, each sample surface was tested for metal "rub-off" by lightly rubbing the metal surface with a cotton swab using the same number of rubs and approximately the same pressure for each sample tested. The samples were further evaluated by heat sealing an ethylene vinyl acetate film to the metallized PET, at 220° F. and 40 psi for 2 seconds, subsequently delaminating the two films, and estimating the amount of metal removed from the PET film as a result of delamination.

Blocking Evaluations

The tendency of the coated polyester films to block was evaluated by two methods: Flexible Packaging Association Test Procedure TP-4 and a water spot test. The "water spot" blocking test is performed as follows: a small droplet of tap water is placed upon the horizontal surface of the test film, which is then covered by placing a second film strip over the first. The films are left overnight with no pressure applied to the samples. The force necessary to separate the top film from the bottom film sample is then qualitatively measured.

Ink Adhesion

Fresh samples of the coated polyester films prepared as described above were evaluated for ink adhesion using two different ink systems. The ink adhesion tests were conducted by applying the inks to cut pieces of the film samples by a draw down technique using a Pamarro brand hand proofer, followed by forced air oven drying of the ink at 140° F. for at least one minute. A strip of adhesive tape (Scotch Brand No. 610) was adhered to the dried inked surface, rubbed with the finger to insure intimate contact, and then rapidly pulled away from the film. The amount of ink remaining in the area which was under the tape is expressed as a percentage of the area, i.e., no ink removed equals 100% adhesion; all ink removed equals 0% adhesion, with intermediate adhesion values being qualitatively assessed in terms of the proportion of ink remaining adhered to the film.

TABLE I

| | Metal Adhesion | |
|---|---|---|
| Sample | Cotton Swab | EVA Heat Seal/ Delamination |
| Uncoated Control | Good | Good |
| A | Excellent | Excellent |
| B | Excellent | Good |
| C | Excellent | Excellent |
| D | Excellent | Excellent |
| E | Excellent | Excellent |
| F | Excellent | Good |
| G | Excellent | Excellent |
| H | Excellent | Good |
| I | Excellent | Good |

Legend:
"Excellent" means that visual observation could not detect that any metal was removed from the film sample surface.
"Good" means that a small amount of metal was visually observed as having been removed from the film sample surface.
"Poor" means that a considerable amount of metal was visually observed as having been removed from the film sample surface.

TABLE II

| | Blocking Evaluation | |
|---|---|---|
| Sample | TP-4 Test | Water Spot Test |
| Uncoated Control/ Uncoated Control | 0 | 0 |
| A/A | 1.3 | 5 |
| A/Uncoated Control | 1.0 | 2 |
| B/B | .66 | 4 |
| B/Uncoated Control | .33 | 4 |
| C/C | 1.33 | 4 |
| C/Uncoated Control | 0 | 1 |
| D/D | 0.66 | 2 |
| D/Uncoated Control | 0 | 0 |
| E/E | 1.0 | 4 |
| E/Uncoated Control | 1.0 | 0 |
| F/F | 0.66 | 2 |
| F/Uncoated Control | 0 | 1 |

TABLE II-continued

| Sample | Blocking Evaluation TP-4 Test | Water Spot Test |
|---|---|---|
| G/G | 0.66 | 2 |
| G/Uncoated Control | 0 | 1 |
| H/H | 0 | 0 |
| H/Uncoated Control | 0 | 0 |
| I/I | 0 | 1 |
| I/Uncoated Control | 0 | 0 |

Legend:
0 — No blocking
1 — Slight cling
2 — Cling
3 — Slight blocking
4 — Considerable blocking
5 — Complete blocking

TABLE III

| Sample | Ink Adhesion Crown Zellerbach FMB-Red | GPI Sunester Blue |
|---|---|---|
| Uncoated Polyester Control | 50% | 50% |
| A | 99% | 100% |
| B | 100% | 100% |
| C | 99% | 100% |
| D | 99% | 100% |
| E | 99% | 100% |
| F | 100% | 100% |
| G | 95% | 100% |
| H | 90% | 100% |
| I | 75% | 99% |

EXAMPLE II

Evaluation of Various Aqueous Coating Compositions

A new series of aqueous coating compositions were prepared and in-line coated upon polyester film. The clarified sulfonated copolyester and sodium oleate weight percentage concentrations are set forth below.

| Film Sample | Sulfonated Copolyester | Sodium Oleate |
|---|---|---|
| A | 0 | 0 |
| B | 5 | 0 |
| C | 3.75 | 0.1875 |
| D | 3.0 | 0.30 |
| E | 2.5 | 0.375 |
| F | 2.0 | 0.45 |
| G | 1.5 | 0.525 |
| H | 1.25 | 0.5625 |
| I | 0 | 0.75 |

A second series of aqueous compositions were prepared having the following compositions:

| Aqueous Coating Composition | Weight Percentages Sulfonated Copolyester | Sodium Oleate |
|---|---|---|
| J | 4.5 | .075 |
| K | 4.0 | .15 |
| L | 3.5 | .22 |
| M | 3.0 | .30 |
| N | 2.5 | .37 |
| O | 2.0 | .45 |
| P | 1.5 | .52 |
| Q | 1.0 | .60 |
| R | .50 | .66 |

The primer coated polyester films were evaluated for metal adhesion, blocking, and ink adhesion as described above. Test results are set forth in Tables IV-VI.

TABLE IV

| Aqueous Coating Composition | Metal Adhesion Sulfonated Copolyester* | Sodium Oleate* | EVA Lamination Delamination |
|---|---|---|---|
| A | 0 | 0 | Good |
| B | 5.0 | 0 | Excellent |
| C | 3.75 | 0.1875 | Good |
| D | 3.0 | 0.30 | Excellent |
| E | 2.5 | 0.375 | Excellent |
| F | 2.0 | 0.45 | Good |
| G | 1.5 | 0.525 | Excellent |
| H | 1.25 | 0.5625 | Good |
| I | 0 | 0.75 | Poor |
| J | 4.5 | 0.075 | Good |
| K | 4.0 | 0.15 | Excellent |
| L | 3.5 | 0.22 | Good |
| M | 3.0 | 0.30 | Poor |
| N | 2.5 | 0.37 | Excellent |
| O | 2.0 | 0.45 | Excellent |
| P | 1.5 | 0.52 | Good |
| Q | 1.0 | 0.60 | Good |
| R | 0.5 | 0.66 | Good |

Legend:
"Excellent" means that visual observation could not detect that any metal was removed from the film surface.
"Good" means that a small amount of metal was visually observed as having been removed from the film sample surface.
"Poor" means that a considerable amount of metal was visually observed as having been removed from the film sample surface.
*Expressed as weight percentage of total weight of the aqueous coating composition.

TABLE V

| Sample | Blocking Evaluation 3 psi Coated/Uncoated | Coated/Coated | 20 psi Coated/Coated | Coated/Uncoated |
|---|---|---|---|---|
| A | | | | |
| B | 1.33 | 0.66 | 2.33 | 1.33 |
| C | 0.66 | 0.33 | 2.00 | 1.33 |
| D | 0.66 | 0 | 2.00 | 1.00 |
| E | 0.66 | 0 | 1.66 | 1.33 |
| F | 0.33 | 0.33 | 0.66 | 1.00 |
| G | 0 | 0 | 0 | 0.33 |
| H | 0 | 0 | 0 | 0 |
| I | 0 | 0 | 0 | 0 |
| J | 1.66 | 1 | 2.33 | 2.00 |
| K | 1.33 | 1 | 2.00 | 2.00 |
| L | 0.33 | 0.33 | 0.66 | 1.33 |
| M | 1.0 | 0 | 0.66 | 1.00 |
| N | 0.33 | 0 | 0.33 | 0.33 |
| O | 0 | 0 | 0.33 | 0.66 |
| P | 0 | 0 | 0 | 0 |
| Q | 0 | 0 | 0 | 0 |
| R | 0 | 0 | 0 | 0 |

Legend:
0 — No blocking
1 — Slight cling
2 — Cling
3 — Blocking
4 — Considerable blocking
5 — Complete blocking

TABLE VI

| Sample | Ink Adhesion Crown Zellerbach FMB-Red | GPI Sunester Blue |
|---|---|---|
| A | 50% | 50% |
| B | 100% | 100% |
| C | 99% | 100% |
| D | 98% | 97% |
| E | 100% | 100% |
| F | 100% | 100% |
| G | 95% | 100% |
| H | 99% | 100% |
| I | 99% | 100% |
| J | 100% | 100% |
| K | 99% | 100% |
| L | 100% | 100% |

TABLE VI-continued

| | Ink Adhesion | |
|---|---|---|
| Sample | Crown Zellerbach FMB-Red | GPI Sunester Blue |
| M | 100% | 100% |
| N | 100% | 100% |
| O | 100% | 100% |
| P | 100% | 100% |
| Q | 100% | 100% |
| R | 100% | 99% |

EXAMPLE III

Evaluation of Various Aqueous Coating Compositions

Another series of aqueous coating compositions, each having the same 5 weight percent of sulfonated copolyester, were prepared and in-line coated upon polyester film. The sodium oleate concentration was varied from sample to sample as shown below:

| Solution | Composition |
|---|---|
| A | Uncoated Polyester Film Control |
| B | 5% solution of sulfonated copolyester master batch solution |
| C | 5% solution of sulfonated copolyester + 0.1% sodium oleate |
| D | 5% solution of sulfonated copolyester + 0.2% sodium oleate |
| E | 5% solution of sulfonated copolyester + 0.3% sodium oleate |
| F | 5% solution of sulfonated copolyester + 0.4% sodium oleate |
| G | 5% solution of sulfonated copolyester + 0.5% sodium oleate |
| H | 5% solution of sulfonated copolyester + 0.6% sodium oleate |
| I | 5% solution of sulfonated copolyester + 0.7% sodium oleate |
| J | 5% solution of sulfonated copolyester + 0.8% sodium oleate |
| K | 5% solution of sulfonated copolyester + 0.9% sodium oleate |
| L | 5% solution of sulfonated copolyester + 1.0% sodium oleate |
| M | 0.75% sodium oleate |

The primer coated polyester films were evaluated for metal adhesion, blocking, and ink adhesion. Test results are set forth in Tables VII–IX.

TABLE VII

| | Metal Adhesion | |
|---|---|---|
| Film Sample | | EVA Heat Seal/Delamination |
| A | Uncoated Polyester Film Control | Good |
| B | 5% sulfonated copolyester | Excellent |
| C | 5% sulfonated copolyester + 0.1% sodium oleate | Poor |
| D | 5% sulfonated copolyester + 0.2% sodium oleate | Poor |
| E | 5% sulfonated copolyester + 0.3% sodium oleate | Excellent |
| F | 5% sulfonated copolyester + 0.4% sodium oleate | Excellent |
| G | 5% sulfonated copolyester + 0.5% sodium oleate | Excellent |
| H | 5% sulfonated copolyester + 0.6% sodium oleate | Poor |
| I | 5% sulfonated copolyester + 0.7% sodium oleate | Excellent |
| J | 5% sulfonated copolyester + 0.8% sodium oleate | Excellent |
| K | 5% sulfonated copolyester + 0.9% sodium oleate | Excellent |
| L | 5% sulfonated copolyester + 1.0% sodium oleate | Excellent |
| M | 0.75% sodium oleate | Excellent |

Legend:
"Excellent" means that visual observation could not detect that any metal was removed from the film sample surface.
"Good" means that a small amount of metal was visually observed as having been removed from the film sample surface.
"Poor" means that a considerable amount of metal was visually observed as having been removed from the film sample surface.

TABLE VIII

| | Blocking Evaluation | |
|---|---|---|
| | 3 psi | |
| Sample | Coated/Coated | Coated/Uncoated |
| A | | |
| B | 0.33 | 0 |
| C | 0 | 0.33 |
| D | 0 | 0 |
| E | 0 | 0 |
| F | 0 | 0 |
| G | 0 | 0 |
| H | 0 | 0 |
| I | 0.33 | 0 |
| J | 0 | 0 |
| K | 0 | 0 |
| L | 0 | 0 |
| M | 0 | 0 |

Legend:
0 — No blocking
1 — Slight cling
2 — Cling
3 — Blocking
4 — Considerable blocking
5 — Complete blocking

EXAMPLE IV

Two Side Coating Evaluation

A series of aqueous coating compositions were prepared and in-line coated onto uniaxially oriented polyester film before it was transversely oriented, heat set, and wound into a roll. Both sides of the uniaxially oriented polyester film were subjected to an electric corona discharge immediately prior to coating. A total of 9 biaxially oriented film samples were produced having the following coatings:

| Sample | Side "A" | Side "B" |
|---|---|---|
| A | 5% sulfonated copolyester | 5% sulfonated copolyester |
| B | 5% sulfonated copolyester + 0.5% sodium oleate | 5% sulfonated copolyester |
| C | 5% sulfonated copolyester + 1.0% sodium oleate | 5% sulfonated copolyester |
| D | 5% sulfonated copolyester + 2.0% sodium oleate | 5% sulfonated copolyester |
| E | 5% sulfonated copolyester | 5% sulfonated copolyester + 0.5% sodium oleate |
| F | 5% sulfonated copolyester | 5% sulfonated copolyester + 1.0% sodium oleate |
| G | 5% sulfonated copolyester | 5% sulfonated copolyester + 2.0% sodium oleate |
| H | 5% sulfonated copolyester + 0.5% sodium oleate | 5% sulfonated copolyester + 0.5% sodium oleate |
| I | 5% sulfonated copolyester + 1.0% sodium oleate | 5% sulfonated copolyester + 1.0% sodium oleate |

The coated films were evaluated for coating patterns, winding performance, and coefficient of friction.

TABLE X

| | Coating Pattern Identification |
|---|---|
| Film Sample | Coating Patterns |
| A | No |
| B | No |
| C | No |
| D | No |
| E | Yes-streaks |
| F | Yes-streaks |
| G | Yes-streaks |
| H | No |
| I | Yes-streaks |

TABLE XI

| | Winding Performance |
|---|---|
| Film Sample | Winding Performance Rating |
| A | Poor |
| B | Excellent |
| C | Excellent |
| D | Excellent |
| E | Good |
| F | Excellent |
| G | Excellent |
| H | Excellent |
| I | Excellent |

Legend:
"Excellent" — no winding problems, no winding defects were present in the rewound roll
"Good" — slight winding problems, a few wrinkles in the rewound roll
"Poor" — considerable winding problems, numerous wrinkles in the rewound roll

TABLE XII

| | COF | |
|---|---|---|
| Film Sample | Static Coated/Coated | Kinetic Coated/Coated |
| A | .756 | .65 |
| B | .535 | .51 |
| C | .49 | .48 |
| D | .515 | .495 |
| E | | |
| F | | |
| G | | |
| H | .57 | .53 |
| I | .51 | .485 |

Note: Each determination represents the average of 10 measurements.

EXAMPLE V

Slitting and Winding Evaluation

Twelve master rolls of dual-side coated biaxially oriented polyester film were made using three aqueous coating compositions and three coating schemes. The master rolls so produced were wrapped in polyethylene bags, placed in wooden shipping boxes, and overwrapped with polyethylene film. The packaged master rolls were then aged in a warehouse for approximately 2 weeks at ambient conditions prior to being slit and rewound at 600 fpm.

The splitting and rewinding performance of these slit rolls is set forth in Table XIII. Film samples were also evaluated for metal adhesion and ink adhesion. Test results are summarized in Table XIV.

TABLE XIII

| | Slitting and Rewinding Evaluation | |
|---|---|---|
| | Master Roll Coating Composition | Performance Rating |
| 1 | Side A 5% sulfonated copolyester Side B 5% sulfonated copolyester | Poor |
| 2 | Side A 5% sulfonated copolyester + silica Side B 5% sulfonated copolyester | Good |
| 3 | Side A 5% sulfonated copolyester + sodium oleate Side B 5% sulfonated copolyester | Excellent |

Legend:
"Poor" — The rolls exhibit soft creases and edge pimples.
"Good" — The rolls exhibit edge pimples.
"Excellent" — The rolls are substantially free of soft creases and edge pimples.

TABLE XIV

| | Metal Adhesion | | Ink Adhesion | |
|---|---|---|---|---|
| | EVA Heat Seal | EAA Heat Seal* | CZ-FMB Red | GPI Sunester Blue |
| A 5% sulfonated copolyester B 5% sulfonated copolyester | Excellent | Poor | 100% | 100% |
| A 5% sulfonated copolyester + silica B 5% sulfonated copolyester | Excellent | Excellent | 100% | 100% |
| A 5% sulfonated copolyester + sodium oleate B 5% sulfonated copolyester | Excellent | Good | 100% | 100% |

We claim:

1. An oriented thermoplastic film having a metal adhesion promoting coating on at least one side, said coating having been applied as an aqueous coating composition comprising
   (i) from 1 to 10 weight percent, based upon the total weight of the coating composition, of a sulfonated copolyester consisting essentially of the polyester condensation product of the following monomers or their polyester-forming equivalents:
      (A) about 65 to 95 mole percent of isophthalic acid;
      (B) about 0 to 30 mole percent of at least one aliphatic dicarboxylic acid of the formula $HOOC(CH_2)-_nCOOH$, wherein n ranges from about 1–11;
      (C) about 5 to about 15 mole percent of at least one sulfomonomer containing an alkali metal sulfonate group attached to a dicarboxylic aromatic nucleus; and
      (D) stoichiometric quantities of about 100 mole percent of at least one copolymerizable aliphatic or cycloaliphatic alkylene glycol having about from 2 to 11 carbon atoms,
   (ii) from 0.05 to 3 weight percent, based upon the total weight of the coating composition, of at least one water soluble alkali metal salt of a fatty acid having from 10 to 18 carbon atoms.

2. The film of claim 1 wherein said thermoplastic film is selected from the group consisting of polyester films, polyamide films, polycarbonate films, polyolefin films, and polyvinyl chloride films.

3. The film of claim 2 wherein said thermoplastic film is polyethylene terephthalate.

4. The film of claim 1 wherein said metal adhesion promoting coating has a dry thickness ranging from about $10^{-7}$ to $10^{-5}$.

5. The film of claim 1 wherein both sides of the film are coated with said aqueous coating composition.

6. An improved method for manufacturing a thermoplastic oriented film having a metal adhesion promoting coating on at least one side comprising
   (i) extruding a substantially amorphous thermoplastic resin in sheet-like form and subsequently cooling said resin to form cast thermoplastic sheet,
   (ii) subsequently orienting said thermoplastic sheet in the longitudinal direction, thereby forming monoaxially oriented thermoplastic film,
   (iii) coating said monoaxially oriented thermoplastic film with an aqueous coating composition comprising
      (a) from 1 to 10 weight percent, based upon the total weight of the coating composition, of a sulfonated copolyester consisting essentially of the polyester condensation product of the following monomers or their polyester-forming equivalents:
         (A) about 65 to 95 mole percent of isophthalic acid;
         (B) about 0 to 30 mole percent of at least one aliphatic dicarboxylic acid of the formula $HOOC(CH_2)-_nCOOH$, wherein n ranges from about 1-11;
         (C) about 5 to about 15 mole percent of at least one sulfomonomer containing an alkali metal sulfonate group attached to a dicarboxylic aromatic nucleus; and
         (D) stoichiometric quantities of about 100 mole percent of at least one copolymerizable aliphatic or cycloaliphatic alkylene glycol having about from 2 to 11 carbon atoms,
      (b) from 0.05 to 3 weight percent, based upon the total weight of the coating composition, of at least one water soluble alkali metal salt of an unsaturated fatty acid having from 10 to 18 carbon atoms;
   (iv) subsequently orienting said monoaxially oriented thermoplastic film in the transverse direction, thereby forming biaxially oriented thermoplastic,
   (v) heatsetting said biaxially oriented thermoplastic film.

7. The process of claim 6 wherein said monoaxially oriented thermoplastic film is surface treated prior to being coated with said aqueous coating composition.

8. The process of claim 7 wherein said surface treatment comprises subjecting the surface of said film to an electric corona discharge.

9. A metallized thermoplastic film comprising a base of oriented thermoplastic film, a primer coating applied to one or both sides of said thermoplastic film at a dry weight thickness of from about $10^{-7}$ to $10^{-5}$ inch, said coating consisting essentially of (1) the polyester condensation product of the following monomers or their polyester forming equivalents:
   (A) about 65 to 95 mole percent of isophthalic acid;
   (B) about 0 to 30 mole percent of at least one aliphatic dicarboxylic acid of the formula $HOOC(CH_2)-_nCOOH$, wherein n ranges from about 1-11;
   (C) about 5 to about 15 mole percent of at least one sulfomonomer containing an alkali metal sulfonate group attached to a dicarboxylic aromatic nucleus; and
   (D) stoichiometric quantities of about 100 mole percent of at least one copolymerizable aliphatic or cycloaliphatic alkylene glycol having about from 2 to 11 carbon atoms,
and (2) at least one water soluble alkali metal salt of a fatty acid having from 10 to 18 carbon atoms, said film having a metal coating applied thereto, the thickness of said coating ranging from about 25 to 2000 angstroms.

10. The metallized thermoplastic film of claim 9 wherein the metal applied thereto is selected from the group consisting of zinc, nickel, silver, copper, gold, indium, tin, stainless steel, chromium, titanium and aluminum.

11. The metallized thermoplastic film of claim 10 wherein the metal applied thereto is aluminum.

12. The metallized thermoplastic film of claim 9 wherein the metallic layer is applied by a vacuum deposition technique.

* * * * *